(12) United States Patent
Tanabe

(10) Patent No.: US 8,157,046 B2
(45) Date of Patent: Apr. 17, 2012

(54) COLLISION DETECTION APPARATUS AND PROTECTION SYSTEM

(75) Inventor: Takatoshi Tanabe, Ichinomiya (JP)

(73) Assignee: Denso Corporation, Kariya (JP)

( * ) Notice: Subject to any disclaimer, the term of this patent is extended or adjusted under 35 U.S.C. 154(b) by 1088 days.

(21) Appl. No.: 12/072,217

(22) Filed: Feb. 25, 2008

(65) Prior Publication Data

US 2008/0204210 A1 Aug. 28, 2008

(30) Foreign Application Priority Data

Feb. 28, 2007 (JP) ................................. 2007-049568

(51) Int. Cl.
B60K 28/14 (2006.01)
(52) U.S. Cl. .................... 180/274; 296/187.04; 340/436
(58) Field of Classification Search .................. 180/274; 296/187.04; 340/436
See application file for complete search history.

(56) References Cited

U.S. PATENT DOCUMENTS

| | | | |
|---|---|---|---|
| 4,677,857 A | | 7/1987 | Feldmann |
| 6,193,303 B1 * | | 2/2001 | Urushiyama et al. .... 296/187.03 |
| 6,332,697 B2 * | | 12/2001 | Soga et al. ................. 362/368 |
| 7,210,362 B2 | | 5/2007 | Tsutaya |
| 7,347,464 B2 * | | 3/2008 | Tanabe .............................. 293/4 |
| 7,416,231 B2 * | | 8/2008 | Takahashi et al. ............ 293/102 |
| 7,556,118 B2 * | | 7/2009 | Huh et al. ...................... 180/274 |
| 7,854,453 B2 * | | 12/2010 | Tanabe .......................... 293/102 |
| 7,856,880 B2 * | | 12/2010 | Schillinger et al. ............. 73/587 |
| 2006/0185922 A1 | | 8/2006 | Tanabe |
| 2006/0231321 A1 * | | 10/2006 | Takahashi ...................... 180/274 |
| 2007/0046044 A1 * | | 3/2007 | Tanabe .......................... 293/120 |
| 2007/0115104 A1 * | | 5/2007 | Suzuki et al. .................. 340/436 |
| 2007/0288139 A1 * | | 12/2007 | Schillinger et al. ............. 701/36 |

FOREIGN PATENT DOCUMENTS

| | | |
|---|---|---|
| DE | 102 17 031 | 10/2003 |
| DE | 103 31 862 | 2/2005 |
| DE | 10 2004 022 808 | 12/2005 |
| JP | 61-118621 | 6/1986 |
| JP | 2004-156937 | 6/2004 |

OTHER PUBLICATIONS

Office action dated Jul. 21, 2008 in German Application No. 10 2008 009 964.3 with English translation thereof.

* cited by examiner

*Primary Examiner* — Drew Brown
(74) *Attorney, Agent, or Firm* — Harness, Dickey & Pierce, PLC

(57) ABSTRACT

A collision detection apparatus includes (i) a bumper reinforcement, (ii) a side supporting member as a side member or a crash box, (iii) a deforming body, and (iv) a strain detecting device. In this collision detection apparatus, frictional force exerted on the interface between the deforming body and the bumper reinforcement or the side supporting member is increased. In the collision detection apparatus, degradation in the detection accuracy of a strain detecting device is suppressed.

13 Claims, 3 Drawing Sheets

VEHICLE FRONT ← → VEHICLE REAR

VEHICLE FRONT ← → VEHICLE REAR

VEHICLE FRONT ← → VEHICLE REAR

VEHICLE FRONT ⟵        ⟶ VEHICLE REAR

COLLISION DETECTION APPARATUS AND PROTECTION SYSTEM

CROSS REFERENCE TO RELATED APPLICATION

This application is based on and incorporates herein by reference Japanese Patent Application No. 200749568 filed on Feb. 28, 2007.

FIELD OF THE INVENTION

The present invention relates to a collision detection apparatus for detecting a collision of a vehicle with an object and in particular to a collision detection apparatus for detecting a collision between a vehicle and a pedestrian.

BACKGROUND OF THE INVENTION

In recent years, efforts have been made to enhance the level of safety in car accidents. With respect to the safety of vehicles, it has been required not only to ensure the safety of occupants in an accident but also to prevent a pedestrian from being fatally damaged when he/she collides with a vehicle.

With respect to devices for protecting a pedestrian who has collided with a vehicle, there is devised a method of reducing the value of an injury suffered by a pedestrian, who collides with a vehicle and falls down on the engine hood (impact received by the pedestrian). Impact a pedestrian receives is reduced; thereby, the pedestrian is prevented from being fatally damaged. In these protective devices, it is important to sense or detect a collision of a pedestrian or the like with a vehicle.

With respect to devices for detecting a collision with a vehicle, there are, for example, methods of assembling a wire, a stress sensor, or an optical fiber to a front bumper. In these methods, a collision is sensed from change in the tension of the wire, an output signal from the stress sensor, attenuation of light passing through the optical fiber, or the like.

However, these devices involve a problem. It is required to install a wire, a stress sensor, or an optical fiber along a front bumper and this incurs the expansion of an installation space or the complication of installation structure. That is, this results in degradation in ease of assembly and increase in assembling cost.

To cope with this problem, there is developed a collision detection apparatus with attention paid to the fact that a side member or a crash box originally equipped in a vehicle is deformed at the time of a collision. This collision detection apparatus is constructed of: a bumper reinforcement so disposed that it is extended in the direction of the width of the vehicle; a side supporting member as a side member or a crash box coupled with the bumper reinforcement and so disposed that it is extended in the direction of the length of the vehicle; and a strain detecting device for detecting strain produced in the side supporting member.

When the side supporting member (crash box) produces strain due to a collision, the collision detection apparatus detects this strain and thereby senses the collision.

However, this collision detection apparatus for detecting or sensing a collision by detecting strain in a side supporting member involves a problem. The side supporting member and the strain detecting device can be displaced from each other and this can lead to a detection error. That is, the accuracy of strain detection is degraded in the collision detection apparatus.

SUMMARY OF THE INVENTION

The invention has been made in consideration of the foregoing. It is an object of the invention to provide a collision detection apparatus wherein degradation in the detection accuracy of a strain detecting device is suppressed.

To solve the above problem, the inventors repeatedly considered a collision detection apparatus that can be assembled to a bumper of a vehicle and eventually made this invention.

According to a first example of the present invention, a collision detection apparatus for a vehicle is provided as follows. A bumper reinforcement is provided to be disposed to be extended in a width direction of the vehicle. A side supporting member is provided to include one of a side member and a crash box and to be coupled with the bumper reinforcement and disposed to be extended in a length direction of the vehicle. A deforming body is provided to include (i) a substantially plate-shaped main part extended in the length direction and (ii) a fixing part including a pair of a first fixing portion and a second fixing portion. The fixing part is fixed to a mating member, which includes at least one of the side supporting member and the bumper reinforcement. A strain detecting device is provided to be fixed to the main part of the deforming body to detect strain produced in the side supporting member. Here, an uneven member is formed in at least one of (i) a facing side of the fixing part and (ii) a facing side of the mating member opposing to each other.

According to a second example of the present invention, a protection system is provided as follows. The collision detection apparatus of the first example is included. A collision determining device is configured to determine an object that collides with the vehicle based on an output signal from the collision detection apparatus. An actuating device is configured to actuate the protecting device when it is determined that the object that collides with the vehicle is a pedestrian.

According to a third example of the present invention, a collision detection apparatus for a vehicle is provided as follows. A bumper reinforcement is provided to be disposed to be extended in a width direction of the vehicle. A side supporting member is provided to include one of a side member and a crash box and to be coupled with the bumper reinforcement and disposed to be extended in a length direction of the vehicle. A deforming body is provided to include (i) a substantially plate-shaped main part extended in the length direction and (ii) a fixing part including a pair of a first fixing portion and a second fixing portion. The fixing part is fixed to a mating member, which includes at least one of the side supporting member and the bumper reinforcement. A strain detecting device is provided to be fixed to the main part of the deforming body to detect strain produced in the side supporting member. An intervening member is provided to be disposed between the fixing part and the mating member. Here, each of (i) a coefficient of friction at faces of contact between the intervening member and the fixing part and (ii) a coefficient of friction at faces of contact between the intervening member and the mating member is larger than a coefficient of friction at faces of contact between the fixing part and the mating member.

According to a fourth example of the present invention, a protection system is provided as follows. The collision detection apparatus of the third example is included. A collision determining device is configured to determine an object that collides with the vehicle based on an output signal from the collision detection apparatus. An actuating device is configured to actuate the protecting device when it is determined that the object that collides with the vehicle is a pedestrian.

In the collision detection apparatus, displacement between the deforming body and the mating member is thus suppressed. That is, when the vehicle collides with an object, the deforming body can transmit strain in the side supporting member to the strain detecting device with loss significantly reduced. This suppresses degradation in the detection accuracy of the collision detection apparatus.

The protection system uses the above collision detection apparatus. That is, the protection system uses the collision detection apparatus excellent in the accuracy of collision detecting and in the protection system, as a result, malfunction due to false detection is suppressed.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Hereafter, the present invention will be described based on embodiments.

As an embodiment of the present invention, a collision detection apparatus installed in a bumper of a vehicle was fabricated.

First Embodiment

Figure 1:
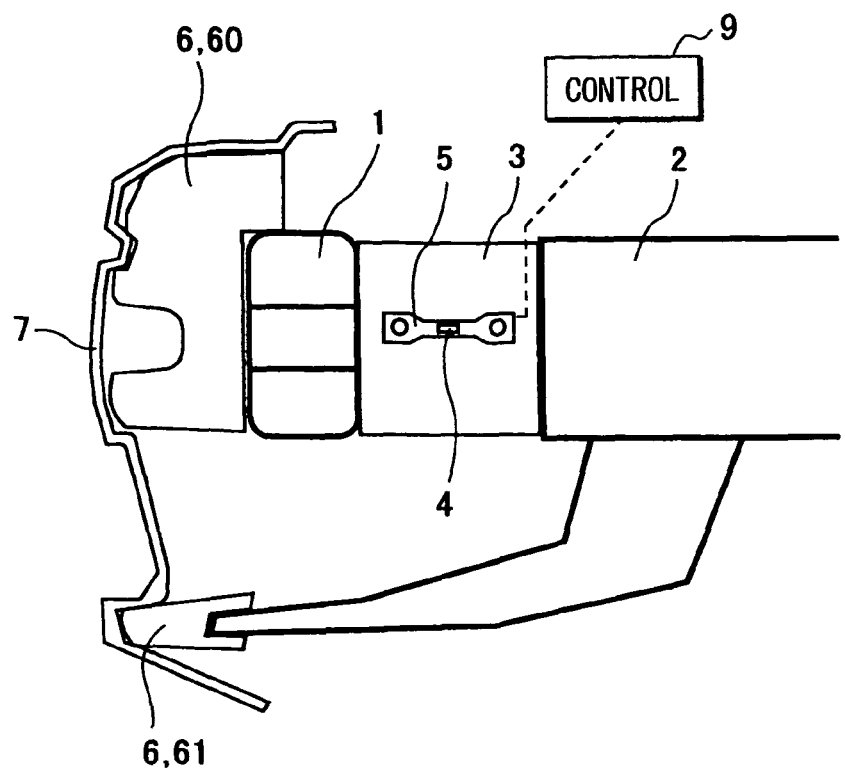
FIG. 1 is a drawing illustrating the configuration of a collision detection apparatus in a first embodiment.
Figure 2:
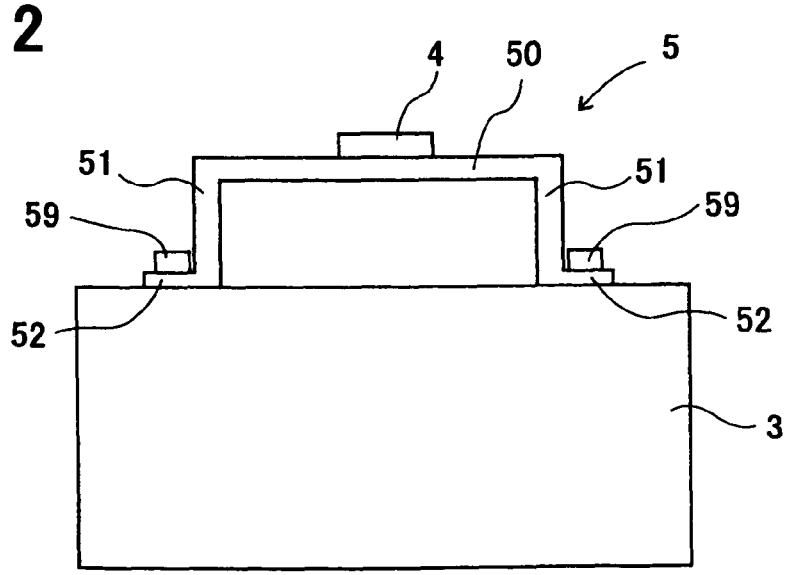
FIG. 2 is a drawing illustrating the configuration of the collision detection apparatus in proximity to a crash box in the first embodiment.

A collision detection apparatus in this embodiment includes a bumper reinforcement 1, a side member 2, a crash box 3, a strain gage 4, a deforming body 5, a bumper absorber 6, a bumper cover 7, and a control device 9. FIGS. 1 and 2 illustrate the configuration of the collision detection apparatus in this embodiment. FIG. 1 illustrates the overall configuration of the collision detection apparatus and FIG. 2 illustrates its configuration in proximity to the crash box 3.

The bumper reinforcement 1 is a metal member extended along the direction of the width (i.e., the width direction) of the vehicle. The bumper reinforcement 1 is a structural member constructing part of the frame of the vehicle. In this embodiment, the bumper reinforcement 1 is constructed of a hollow member having two tiered beams in the center of its interior and substantially double-barred rectangle-shaped cross sections. The bumper reinforcement 1 is fixed to a pair of the side members 2 through the crash boxes 3. The side members 2 of a vehicle to which the bumper reinforcement 1 is fixed are paired members protruded frontward of the engine room.

The side members 2 are so disposed that they are respectively extended from the ends of the bumper reinforcement 1 in the direction of the width of the vehicle toward the rear of the vehicle. The side members 2 are structural members constructing part of the vehicle frame similarly with the bumper reinforcement 1. Each of the side members 2 is constructed of, for example, a hollow member whose sections in the direction perpendicular to the direction of the length (i.e., the length direction) of the vehicle are rectangular.

The crash boxes 3 are members for absorbing energy produced when the front part of the vehicle collides with an object. Each of the crash boxes 3 is disposed between the bumper reinforcement 1 and the corresponding side member 2. Each of the crash boxes 3 is a hollow member formed of metal whose sections in the direction perpendicular to the direction of the length of the vehicle are rectangular, similarly with the side members 2.

The strain gages 4 are each fixed on the corresponding deforming body 5, which is fixed on the corresponding crash box 3; thus, the strain gages 4 are individually fixed on the crash boxes 3. Each of the strain gages 4 detects strain in the corresponding crash box 3 as strain in the corresponding deforming body 5.

Each of the deforming bodies 5 is a member formed by bending a strip-shaped metal plate so that its section in the direction of the length of the vehicle are in a substantial U shape. The deforming bodies 5 are so fixed that they are stretched in the direction of the length of the vehicle. Each of the deforming bodies 5 is so constructed that the central part of its substantial U shape in the direction of its length forms a main part 50 and end portions 51, 51 are formed at both ends of the main part 50 in the direction of its length. Each strain gage 4 is fixed on the outer surface of the main part 50, constructed of the bottom of the substantial U shape, of the corresponding deforming body 5. (This outer surface of the main part is a surface on the back of its inner surface opposed to the corresponding crash box 3.) Each of the main parts 50 is so formed that the width of its strip-shaped portion is shorter than that of the end portions 51. Each of the deforming bodies 5 has a fixing part, which includes a pair of flanges 52, 52 (also referred to a pair of fixing portions 52) so that the flanges are extended outward from the open end of the substantial U shape. Each of the deforming bodies 5 is fixed by tightening a bolt 59 penetrating the flanges 52, 52 and the corresponding crash box 3. The bolts 59 are fixed to the crash boxes 3 so that they penetrate through holes 520, 520 formed in the flanges 52, 52.

Figure 3:
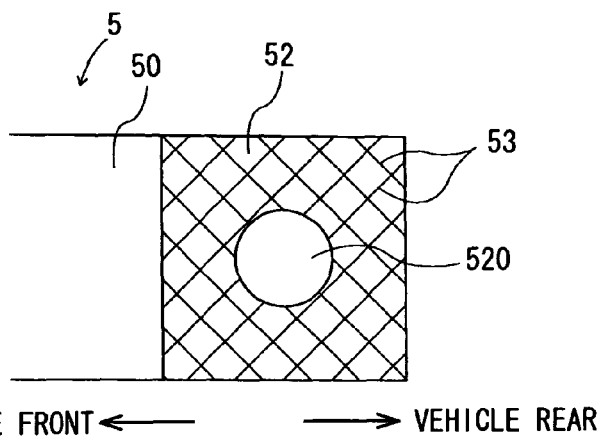
FIG. 3 is a drawing illustrating the surface of a flange of a deforming body of the collision detection apparatus in the first embodiment.

As illustrated in FIG. 3, multiple grooves 53 are formed in the faces of the flanges 52, 52 of the deforming bodies 5 opposed to the respective crash boxes 3. These grooves 53 are extended in directions intersecting with the direction of the length of the corresponding deforming body 5 (the direction of the length of the vehicle). The grooves 53 are so formed that they are extended at an angle of 45° to the direction of the length of the vehicle. The multiple grooves 53 are so formed that they are extended in parallel with or perpendicularly to one another. The grooves 53 are formed by press molding by pressing a mold against the faces (i.e., the facing side facing the crash boxes 3) of the flanges 52 opposed to the crash boxes 3.

The bumper absorber 6 is a member disposed on the vehicle front side of the bumper reinforcement 1. The bumper absorber 6 is extended in the direction of the width of the vehicle and is used to absorb impact from the front of the vehicle. In this embodiment, the bumper absorber 6 is constructed of an upper absorber 60 positioned above in the direction of the height of the vehicle and a lower absorber 61 positioned under the upper absorber 60.

The bumper cover 7 is a member disposed at the forward end of the vehicle to cover the vehicle front side of the bumper absorber 6. When an object collides with the vehicle, usually, the bumper cover 7 collides with it.

The control device 9 is connected to the strain gages 4 and senses (determines) a collision based on strain detected by the strain gages 4. The control device 9 can determine a collision by a publicly known determination method. When the amount of strain detected becomes larger than a preset threshold value, for example, it can be determined that a collision has occurred. The control device 9 may be equipped in the vehicle beforehand. It is more desirable that it should be the control device 9 for an occupant protective device or the pedestrian protective device.

Hereafter, description will be given to how a collision is sensed by the collision detection apparatus in this embodiment.

When an object collides with the bumper of this vehicle, the object presses the bumper of the vehicle. The object presses the bumper absorber 6 through the bumper cover 7 on the bumper of the vehicle. The bumper absorber 6 absorbs part of impact arising from the collision of the object and further presses the bumper reinforcement 1.

The pressed bumper reinforcement 1 absorbs part of the impact and further presses the crash box 3. The pressed crash box 3 is deformed and is compressed in the direction of the length of the vehicle. That is, strain in the direction of the length of the vehicle is produced in the crash box 3.

When strain is produced in the crash box 3, the distance between the flanges 52, 52 of the deforming body 5 fixed on the crash box 3 is shortened. That is, the deforming body 5 is compressed in the direction of the length of the vehicle. An uneven member constructed of grooves is formed on the surfaces (facing sides) of the flanges 52, 52 as the portions of the deforming body 5 for fixation to the crash box 3. Therefore, frictional force between the crash box 3 and the flanges 52 is increased at this time. In this embodiment, slippage (displacement) at the interface is made less prone to occur because of this frictional force. That is, in this embodiment, the strain produced in the crash box 3 is transmitted to the deforming body 5 with loss significantly reduced.

When compressive stress is applied to the deforming body 5 in the direction of the length of the vehicle (the direction of the length of the strip), strain is produced in proximity to the main part 50. The reason for this is as follows: the deforming body is so formed that the width of its strip shape is shorter in proximity to the main part 50 than in proximity to the end portions 51 and stress is concentrated there.

The stress concentrated on the main part 50 causes compressive strain in the main part 50 and this compressive strain is detected by the corresponding strain gage 4.

Meanwhile, the following explains specific description with respect to a conventional technology in which no uneven member are provided. In general, a threaded screw hole for passing a bolt is so formed that it is larger than the outside diameter of the shank of the bolt. That is, there is a clearance between the outer circumferential surface of the shank of a bolt and the inner circumferential surface of a threaded screw hole for it. The deforming body 5 is fixed on the outer circumferential surface of the side supporting member. The outer circumferential surface of the side supporting member on which the deforming body is fixed is extended in the direction of the length of the vehicle. When the vehicle collides with an object, stress is exerted in this direction (the direction along the surface of the side supporting member). At this time, the flange 52 as a fixing portion is slid by a distance equivalent to the clearance around the bolt 59 and displacement is produced. When displacement is produced, strain in the side supporting member corresponding to this displacement cannot be detected. That is, the accuracy of strain detection is degraded in the collision detection apparatus in the conventional technology.

In contrast, according to the collision detection apparatus in this embodiment, the occurrence of displacement at the interface between each deforming body 5 with the strain gage 4 fixed thereto and the corresponding crash box 3 is eliminated. In the collision detection apparatus in this embodiment, the interface between each deforming body 5 and the corresponding crash box 3 is located along the direction of the length of the vehicle. This is the direction in which impact (stress) from a collision is transmitted, and slippage is prone to occur at the interface. As mentioned above, however, this embodiment is so constructed that displacement at the interface between each deforming body 5 and the corresponding crash box 3 does not occur. That is, the collision detection apparatus in this embodiment is so constructed that a detection error due to slippage at the interface between each deforming body 5 formed of metal and the corresponding crash box 3 is not produced. This makes the collision detection apparatus in this embodiment excellent in detection accuracy.

Second Embodiment

This embodiment is a collision detection apparatus having the same construction as that of the first embodiment except the faces of the flanges 52, 52 of each deforming body 5 opposed to the corresponding crash box 3.

Figure 4:
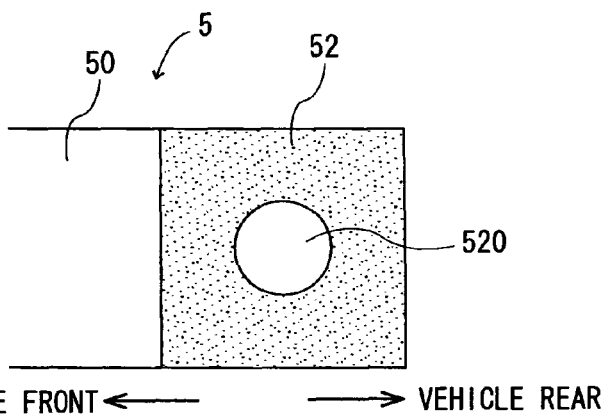
FIG. 4 is a drawing illustrating the surface of a flange of a deforming body of a collision detection apparatus in a second embodiment.

As illustrated in FIG. 4, grain in a crepe pattern is formed in the faces of the flanges 52, 52 of each deforming body 5 in this embodiment opposed to the corresponding crash box 3.

In this embodiment, the uneven member formed in the face (i.e., facing side) of each flange 52 opposed to the corresponding crash box 3 is a grain pattern or matte pattern. Also in this embodiment, displacement at the interface between each deforming body 5 and the corresponding crash box 3 does not occur as in the first embodiment. That is, also in this embodiment, the collision detection apparatus is excellent in detection accuracy as in the first embodiment.

Third Embodiment

Figure 5:
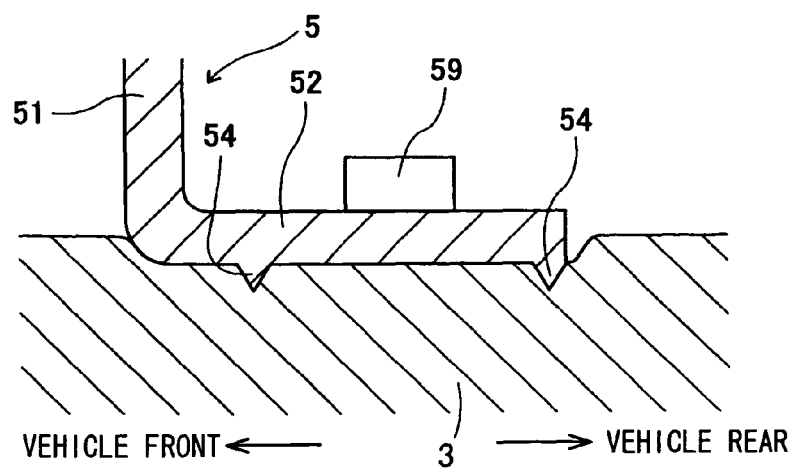
FIG. 5 is a drawing illustrating the configuration of a deforming body of a collision detection apparatus in proximity to a crash box in a third embodiment.

This embodiment is a collision detection apparatus having the same construction as that of the first embodiment, excepting that the facing sides of the flanges 52, 52 of the deforming bodies 5 and the crash boxes 3 are different in construction. FIG. 5 illustrates the configuration of the collision detection apparatus in this embodiment in proximity to a flange 52 closer to the rear side of the vehicle and the corresponding crash box 3.

In this embodiment, the hardness of a metal constructing the deforming bodies 5 is higher than that of a metal constructing the crash boxes 3. As illustrated in FIG. 5, multiple cone-shaped projections 54 are formed on the faces of the flanges 52, 52 of each deforming body 5 in this embodiment opposed to the corresponding crash box 3.

In this embodiment, the flanges 52 and the projections 54 bite into the crash boxes 3. When the bolt 59 is tightened to assemble a deforming body 5 to the corresponding crash box 3, the flanges 52 and the projections 54 are caused to bite into the crash box 3 by resulting fastening force.

Also in this embodiment, the occurrence of displacement at the interface between each deforming body 5 with the strain gage 4 fixed thereto and the corresponding crash box 3 is eliminated as in the first embodiment. In the collision detection apparatus in this embodiment, especially, the flanges 52 and the projections 54 bite into the crash boxes 3 and thus displacement does not occur at the interfaces. That is, also in this embodiment, the collision detection apparatus is excellent in detection accuracy as in the first embodiment.

Fourth Embodiment

Figure 6:
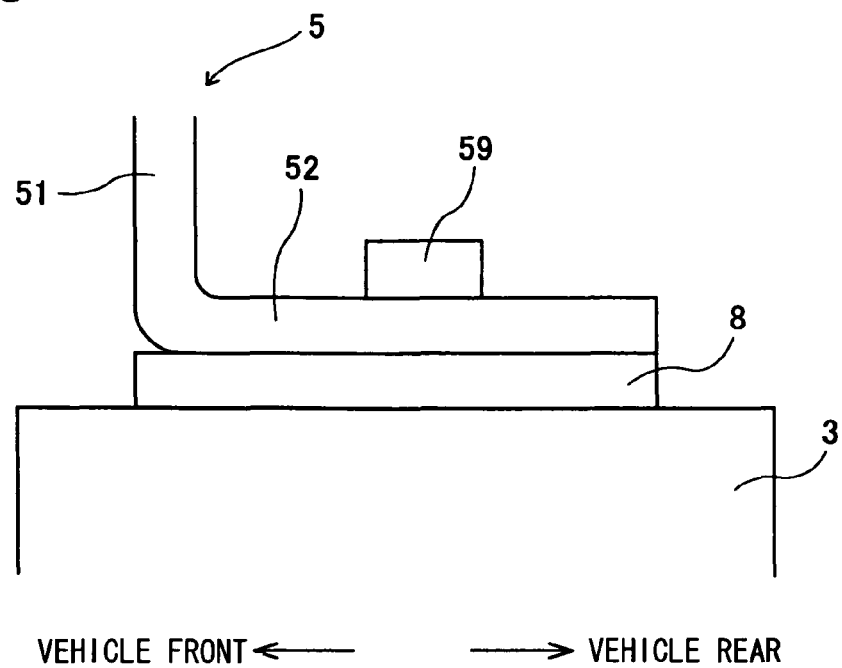
FIG. 6 is a drawing illustrating the configuration of a deforming body of a collision detection apparatus in proximity to a crash box in a fourth embodiment.

This embodiment is a collision detection apparatus having the same construction as that of the first embodiment except that the flanges 52 do not have grooves, and an intervening member 8 is placed between each flange 52 and the corresponding crash box 3. FIG. 6 illustrates the configuration of the collision detection apparatus in this embodiment in proximity of a flange 52 closer to the rear side of the vehicle and the corresponding crash box 3.

In this embodiment, the surfaces of the flanges 52, 52 of the deforming bodies 5 and the crash boxes 3 are smoothly formed.

Each intervening member 8 is formed of a metal having substantially the same rectangular parallelepiped shape as that of the flanges 52. A crepe-like grain pattern is formed on the respective facing sides of the flanges 52 and the crash boxes 3. This grain pattern is the same as the grain pattern formed on the flanges 52 in the second embodiment.

In this embodiment, letting the coefficient of friction at the faces of contact between each intervening member 8 and each flange 52 be $\mu_4$, the coefficient of friction at the faces of contact between each intervening member 8 and each crash box 3 be $\mu_5$, and the coefficient of friction at the faces of contact between each flange 52 and each crash box 3 be $\mu_6$, the relation expressed as $\mu_4 > \mu_6$ and $\mu_5 > \mu_6$ holds.

Also in this embodiment, frictional force is increased at the interfaces between each deforming body 5 with the strain gage 4 fixed thereto and the corresponding intervening members 8 and between each crash box 3 and the corresponding intervening members 8 as in the first embodiment. This helps prevent displacement from being caused at the interfaces. As a result, in the collision detection apparatus in this embodiment, displacement does not occur between each deforming body 5 and the corresponding crash box 3 and a detection error due to slippage at the interfaces is not produced. That is, also in this embodiment, the collision detection apparatus is excellent in detection accuracy as in the first embodiment.

Fifth Embodiment

This embodiment is a collision detection apparatus having the same construction as that of the fourth embodiment except that the intervening members 8 are formed of elastic elastomer. In this embodiment, the coefficients of friction at the contact faces of the intervening members 8 are in the relation expressed as $\mu_4 > \mu_6$ and $\mu_5 > \mu_6$ as in the fourth embodiment.

This embodiment produces the same effect as the fourth embodiment does. In this embodiment, in addition, the intervening members 8 are elastic. Therefore, the adherence at the interfaces between each deforming body 5 and the corresponding intervening members 8 and between each crash box 3 and the corresponding intervening members 8 is enhanced and displacement does not occur at the interfaces. As a result, in the collision detection apparatus in this embodiment, the production of a detection error due to slippage at the interfaces is further prevented.

(First Modification)

In each of the above embodiments, the flanges 52 of each deforming body 5 are fixed to the corresponding crash box 3. Instead, of each deforming body 5, the flange 52 closer to the rear side of the vehicle may be fixed to the side member 2 while the flange 52 closer to the front side of the vehicle is fixed to the corresponding crash box 3. Yet further, of each deforming body 5, the flange 52 closer to the front side of the vehicle may be fixed to the bumper reinforcement 1 while the flange 52 closer to the rear side of the vehicle is fixed to the corresponding crash box 3.

(Other Modifications)

In each of the above embodiments, each deforming body 5 is fixed to a side face of the corresponding crash box 3. However, it need not be fixed to the side face and may be fixed to the upper face or the lower face.

The portion of each crash box 3 positioned between the flanges 52, 52 of the corresponding deforming body 5 may be so constructed that strain is prone to be produced there. An example of such a construction is to partly thin the crash box. With this construction, strain is increased in this portion at the time of a collision, and the collision can be sensed even though its impact is small.

(Pedestrian Protection System)

The collision detection apparatus in the above embodiments and modifications can be used in a pedestrian protection system for protecting a pedestrian at the time of a collision.

Figure 7:
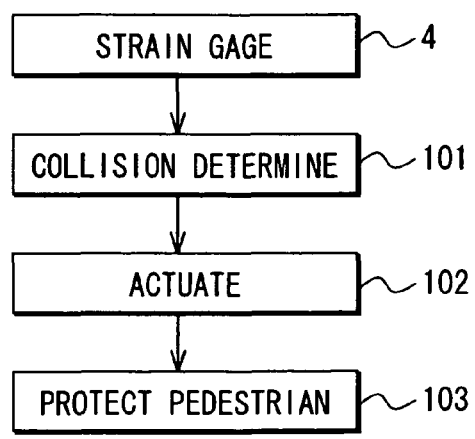
FIG. 7 is a drawing illustrating the configuration of a pedestrian protection system having a collision detection apparatus of the first embodiment.

The pedestrian protection system includes: the collision detection apparatus; a collision determining device that is inputted with an output signal from a strain gage 4 of the collision detection apparatus and determines what has collided with the vehicle based on the output signal; an actuating device for, when the collision determining device determines that a pedestrian has collided with the vehicle, actuating a protecting device; and the pedestrian protecting device for protecting a pedestrian when the vehicle and pedestrian collide with each other. FIG. 7 illustrates the configuration of this protection system.

Strain sensed by the strain gage 4 is transmitted to the collision determining device 101. When the collision determining device senses that an object has collided with the vehicle from the result of detection by the strain gage 4, it determines whether or not the object is a pedestrian. This determination by the collision determining device 101 can be carried out as described below, for example. It determines whether or not an object has collided with the vehicle. When it senses that an object has collided with the vehicle, it computes a collision load from the output signal from the strain gage 4. The collision load has linearity to strain detected by the strain gage 4.

Based on the computed collision load and a vehicle speed detected by a vehicle speed sensor (not shown), the collision determining device 101 computes the mass of the object that has collided with the vehicle. To compute the mass of an object that has collided with the vehicle from a collision load and a vehicle speed, a publicly known method can be used. For example, the mass can be computed using (i) a value obtained by integrating a collision load once and (ii) a vehicle speed.

Then, the control device 9 determines the kind of the object that has collided with the vehicle from the mass of the object. For example, it makes determination as follows: when the mass of the object is within a predetermined range, it determines that the object is a pedestrian; and when the mass is beyond the predetermined range, it determines that the object is a building, another vehicle, or the like.

When the object that has collided with the vehicle is determined to be a pedestrian, the actuating device 102 puts out an actuation signal for actuating the pedestrian protecting device 103. When the pedestrian protecting device 103 receives this actuation signal, it is actuated and protects the pedestrian.

The pedestrian protecting device 103 is mounted in the hood of the vehicle and protects a pedestrian when the pedestrian collides with the vehicle. Examples of the pedestrian protecting device include a device for flipping up the hood, an airbag system for inflating an air bag in the shape of the hood, and the like. As the result of the pedestrian protecting device 103 being actuated, the value of an injury suffered by a pedestrian who has collided with the vehicle is reduced.

The pedestrian protection system in this embodiment uses a collision detection apparatus excellent in the accuracy of collision detecting and the protection system is free from malfunction due to false detection.

Aspects of the subject matter described herein are set out in the following clauses.

(First Aspect)

A collision detection apparatus according to a first aspect includes: a bumper reinforcement so disposed that it is extended in the direction of the width of a vehicle; a side supporting member as a side member or a crash box coupled with the bumper reinforcement and so disposed that it is extended in the direction of the length of the vehicle; a deforming body having a substantially plate-shaped main part extended in the direction of the length of the vehicle and a fixing part having a pair of fixing portions provided on the main part and fixed on a mating member, which is at least one of the side supporting member and the bumper reinforcement; and a strain detecting device for detecting strain produced in the side supporting member, fixed on the main part of the deforming body. The collision detection apparatus according to this aspect detects a collision by detecting strain produced in the side supporting member by the strain detecting device through the deforming body when the collision occurs.

The collision detection apparatus according to this aspect is so constructed as mentioned above. Therefore, a member for collision detecting need not be newly installed along the front bumper and the expansion of an installation space or the complication of installation structure can be suppressed.

In the collision detection apparatus according to this aspect, the strain detecting device is not directly fixed on the bumper reinforcement or the side supporting member. Instead, it is fixed on the deforming body fixed on the bumper reinforcement or the side supporting member. With this construction, the strain detecting device can be assembled after the side supporting member or the bumper reinforcement is assembled and this enhances ease of assembly. Fixing the strain detecting device with the deforming body in-between makes it possible to fix the strain detecting device in position.

In the collision detection apparatus according to this aspect, an uneven member is formed in at least either of the facing sides of each fixing portion and the mating member opposed to each other. When an uneven member is formed in at least either facing side, the coefficient of friction is increased at the contact face of the facing side with the uneven member formed therein. When the coefficient of friction is increased, frictional force required for displacement to be produced between the facing sides (at the interface between them) is increased and thus displacement at the interface is suppressed. As the result of displacement between the deforming body and the mating member being suppressed, degradation in the detecting accuracy of the collision detection apparatus is suppressed.

In the collision detection apparatus according to this aspect, an uneven member only has to be formed in at least either facing side. That is, the uneven member may be formed in the facing side of the fixing part or may be formed in the facing side of the mating member. Or, the uneven member may be formed in both the facing sides (the respective facing sides of the fixing part and the mating member). It is desirable to form the uneven member in the facing side of the fixing part of the deforming body because of ease of machining and assembly.

In the collision detection apparatus according to this aspect, there is no limitation on the shape of the uneven member formed in at least either facing side as long as displacement at the interface can be suppressed by frictional force produced when force is exerted along the interface.

In the collision detection apparatus according to this aspect, it is desirable that the uneven member formed in at least either facing side should be grain, or fine recesses and projections, formed on the surface of the facing side. There is no limitation on the grain pattern and possible examples of the grain include crepe pattern, hide pattern, geometric pattern, rocky texture, woody texture, and the like.

In the collision detection apparatus according to this aspect, it is desirable that the uneven member formed in at least either facing side should be one or more grooves extended in the following direction: the direction intersecting with the direction in which stress arising from a collision is applied (the direction of the length of the vehicle). When the uneven member is formed of one or more grooves extended in the direction intersecting with the direction of the length of the vehicle, recesses and projections are formed at least in the direction of the length of the vehicle. That is, when stress is applied at the time of a collision, frictional force is produced and displacement between the fixing part and the mating member is suppressed. As the number of grooves is increased, the produced frictional force is increased and the occurrence of displacement between the fixing part and the mating member is further suppressed. That is, it is desirable that multiple grooves extended in the direction intersecting with the direction of the length of the vehicle should be formed in the facing side of the fixing part of the deforming body.

In the collision detection apparatus according to this aspect, the uneven member formed in at least either facing side may be so constructed that the following is implemented: a projection is formed in either of the facing sides and a recess to be engaged with the projection is formed in the other. As the result of the projection being engaged with the recess, the occurrence of displacement between the fixing part and the mating member is suppressed. The recess to be engaged with the projection may be formed beforehand or may be formed as the result of the projection biting into the surface to be recessed. It is desirable that the following measure should be taken: either of the fixing part of the deforming body and the mating member is formed of a material harder than that of the other; a projection protruded toward the other is formed on the facing side of the either; and the tip of the projection bites into the other. When the projection bites into the other and the recess is formed, frictional force is produced at the interface at the time of a collision. In addition to this effect, a clearance is eliminated at the interface and the occurrence of displacement is further suppressed. The projection may be formed on the deforming body or may be formed on the mating member.

However, it is desirable to form the projection on the fixing part of the deforming body because of ease of machining and assembly.

In the collision detection apparatus according to this aspect, there is no limitation on how to fix the fixing part of the deforming body and the mating member together and any publicly known method can be used. That is, it is desirable that a through hole should be formed in the fixing part, and the fixing part should be fastened to the mating member with a bolt penetrating the through hole and reaching an inside of the mating member. In the collision detection apparatus according to this aspect, frictional force is produced as the result of an uneven member being formed in the facing sides. Therefore, even when the deforming body and the mating member are fixed together with a bolt as publicly known, displacement between the fixing part of the deforming body and the mating member is suppressed.

In the collision detection apparatus according to this aspect, there is no limitation on the specific shape of the deforming body as long as it includes the following: a substantially plate-shaped main part extended in the direction of the length of the vehicle; and a pair of fixing portions provided on the main part and fixed on a mating member, which is at least one of the side supporting member and the bumper reinforcement. Some examples will be taken. The deforming body may be so constructed that its main part is brought into tight contact with the side supporting member. (With this construction, the deforming body is in the shape of flat plate and the pair of fixing portions and the main part form a plane.) Or, the deforming body may be so constructed that its main part is held at a distance from the side supporting member. (With this construction, the pair of fixing portions and the main part form a substantial U shape or a substantial L shape in the direction of the length of the vehicle.)

In the collision detection apparatus according to this aspect, any member used in conventional collision detection apparatus can be used for the bumper reinforcement, side supporting member, and strain detecting device.

The strain detecting device only has to be capable of detecting strain in the main part of a deforming body when fixed on the main part. A publicly known strain gage or the like can be used for this purpose.

The side supporting member is a side member or a crash box. When a vehicle has a side member or a crash box, it can be used for this purpose. The crash box is used to absorb energy produced when a collision occurs between a vehicle and an object.

The collision detection apparatus according to this aspect is preferably so formed that the following is implemented: the side supporting member has a portion relatively high in strength in the direction of the length of the vehicle and a portion relatively low; and the strain detecting device detects strain in the portion of the side supporting member lower in strength in the direction of the length of the vehicle. The portion lower in strength in the direction of the length of the vehicle corresponds to the above-mentioned portion that is deformed at the time of a collision.

In general, side members and crash boxes are high in rigidity. When a pedestrian or the like collides with the relevant vehicle, they do not produce strain so much and it is difficult to detect the strain. To cope with this, the side supporting member is provided with a portion relatively high in strength in the direction of the length of the vehicle and a portion relatively low. Thus, when the vehicle collides with an object, stress is concentrated on the portion of the side supporting member relatively low in strength in the direction of the length of the vehicle. As a result, the stress exerted on the portion of the side supporting member relatively low in strength in the direction of the length of the vehicle becomes larger. Then, it becomes larger than stress exerted on the portion of the side supporting member relatively high in strength in the direction of the length of the vehicle. The amount of strain is increased with increase in compressive stress.

That it, the following can be implemented even when impact load applied to a vehicle when it collides with an object is small: strain produced in the portion of the side supporting member relatively low in the direction of the length of the vehicle can be so increased that it can be sufficiently detected by the strain detecting device. Therefore, use of this strain produced in the portion of the side supporting member relatively low in the direction of the length of the vehicle makes it possible to implement the following: even when collision load applied to the vehicle when it collides with an object is small, it can be sensed without fail that the vehicle has collided with an object.

In the collision detection apparatus of this aspect, a plurality of uneven members may be provided in (i) at least one of a facing side of the first fixing portion and a facing side of the mating member facing the first fixing portion and (ii) at least one of a facing side of the second fixing portion and a facing side of the mating member facing the second fixing portion, so that at least one of the uneven members is disposed between a front end of the vehicle and the strain detecting device and at least one of the uneven members is disposed between the strain detecting device and a rear end of the vehicle.

In the collision detection apparatus of this aspect, the first fixing part and the first mating member may be fastened together by a bolt, which penetrates a through hole provided in the fixing part and reaches an inside of the mating member; a plurality of uneven members may be provided, at least one of the uneven members is disposed closer to a front end of the vehicle with respect to the bolt and at least one of the uneven members is disposed closer to a rear end of the vehicle with respect to the bolt.

As an additional aspect of the first aspect, a protection system may be provided to include: the collision detection apparatus of the first aspect; a protecting device for protecting a pedestrian when the vehicle incorporating the collision detection apparatus and the pedestrian collide with each other; a collision determining device that is inputted with an output signal from the collision detection apparatus and determines with what the vehicle has collided based on the output signal; and an actuating device for, when the collision determining device determines that the vehicle has collided with a pedestrian, actuating the protecting device.

The protection system uses the collision detection apparatus of the first aspect. In the protection system according to this aspect, (the strain detecting device of) the collision detection apparatus detects strain in the side supporting member when a pedestrian collides with the vehicle and puts out an output signal. As mentioned above, the polarity of this output signal is constant and false detection due to polarity inversion does not occur.

An output signal from the strain detecting device is inputted to the collision determining device, which in turn determines whether or not a pedestrian has collided with the vehicle. For the collision determining device to determine what has collided with the vehicle, a publicly known determination method can be used.

When the collision determining device determines that a pedestrian has collided with the vehicle, the actuating device transmits an actuation signal for actuating the protecting device to the protecting device according to this result of determination. In this aspect, the collision determining device and the actuating device may be constructed as one control unit (ECU (electronic control unit), etc.).

When the protecting device receives the actuation signal, it is actuated and protects the pedestrian. The protecting device is a publicly known protecting device, such as an air bag.

(Second Aspect)

A collision detection apparatus according to a second aspect includes: a bumper reinforcement so disposed that it is extended in the direction of the width of a vehicle; a side supporting member as a side member or a crash box coupled with the bumper reinforcement and so disposed that it is extended in the direction of the length of the vehicle; a deforming body having a substantially plate-shaped main part extended in the direction of the length of the vehicle and a fixing part having a pair of fixing portions provided on the main part and fixed on a mating member, which is at least one of the side supporting member and the bumper reinforcement; and a strain detecting device for detecting strain produced in the side supporting member, fixed on the main part. The collision detection apparatus according to this aspect detects a collision by detecting strain produced in the side supporting member by the strain detecting device through the deforming body when the collision occurs.

The collision detection apparatus according to this aspect is so constructed as mentioned above. Therefore, a member for collision detecting need not be newly installed along the front bumper and the expansion of an installation space or the complication of installation structure can be suppressed.

In the collision detection apparatus according to this aspect, the strain detecting device is not directly fixed on the bumper reinforcement or the side supporting member. Instead, it is fixed on the deforming body fixed on the bumper reinforcement or the side supporting member. With this construction, the strain detecting device can be assembled after the side supporting member or the bumper reinforcement is assembled and this enhances ease of assembly. Fixing the strain detecting device with the deforming body in-between makes it possible to fix the strain detecting device in position.

The collision detection apparatus according to this aspect is so constructed that the following is implemented: an intervening member is disposed between at least either of the fixing part and the mating member; and each of (i) the coefficient of friction at the faces of contact between the intervening member and the fixing part and (ii) the coefficient of friction at the faces of contact between the intervening member and the mating member is larger than the coefficient of friction at the faces of contact between the fixing part and the mating member. More specific description will be given. Letting the coefficient of friction between the intervening member and the fixing part be $\mu_1$, the coefficient of friction between the intervening member and the mating member be $\mu_2$, and the coefficient of friction between the fixing part and the mating member be $\mu_3$, the relation expressed as $\mu_1 > \mu_3$ and $\mu_2 > \mu_3$ holds. The intervening member has a higher coefficient of friction at the faces of contact between it and the fixing part and between it and the mating member than the coefficient of friction between the fixing part and the mating member. This intervening member is disposed between the fixing part and the mating member. Thus, the following takes place when displacement becomes likely to occur between the fixing part and the intervening member and between the intervening member and the mating member: frictional force is produced and the displacement at the interfaces is suppressed by this frictional force. That is, displacement between the fixing part and the intervening member and between the intervening member and the mating member is suppressed. As a result, displacement between the deforming body and the mating member is suppressed and degradation in the detecting accuracy of the collision detection apparatus is suppressed.

In general, the deforming body and the mating member are formed of metal and the coefficient of friction at their contact faces is low. That is, displacement is prone to occur at the faces of contact between the fixing part of the deforming body and the mating member because of their low coefficients of friction. Disposition of the intervening member high in coefficient of friction between these members makes it possible to suppress displacement at the faces of contact between the deforming body and the mating member.

In this aspect, the intervening member is disposed between at least either of the fixing part and the mating member and the occurrence of displacement in the area where the intervening member is disposed is thereby eliminated. That is, it is desirable that the intervening member should be disposed between one of the pair of fixing portions on the side where displacement is prone to occur at the time of a collision and the mating member. It is further desirable that the intervening member should be displaced between each of the pair of fixing portions and the mating member.

In the collision detection apparatus according to this aspect, there is no limitation on the construction of the surface of the intervening member as long as the following is implemented: the coefficient of friction is increased at the faces of contact between it and the surface of the fixing part to which it is opposed and between it and the surface of the mating member to which it is opposed. Possible examples of the construction of the surface of the intervening member include grain pattern, such as crepe pattern, hide pattern, geometric pattern, rocky texture, and woody texture, and one or more grooves formed in the intervening member.

It is desirable that the intervening member should be formed of a material lower in hardness than those of the fixing part and the mating member. When the intervening member is formed of a material lower in hardness than those of the fixing part and the mating member, the following advantage is brought about: when the deforming body and the mating member is pressure-joined with each other, the adherence between them is increased and displacement between the deforming body and the mating member is more reliably suppressed. More specific description will be given. When the deforming body and the mating member are pressure-joined with each other, the intervening member lower in hardness is deformed (plastically or elastically). Then, their surfaces or facing sides are brought into tight contact with each other and this increases the touch area. As a result, frictional force produced at the interface is further increased and displacement between the deforming body and the mating member is further suppressed.

There is no limitation on the low-hardness material constructing the intervening member as long as its hardness is lower than those of the fixing part and the mating member. Possible examples of the material of the intervening member include metal and resin. It is desirable to form the intervening member of resin or elastomer because they have high elasticity and this elasticity significantly enhances the adherence.

In the collision detection apparatus according to this aspect, there is no limitation on how to fix the fixing part of the deforming body and the mating member together and any publicly known method can be used. That is, it is desirable that a through hole should penetrate the fixing part and the intervening member when the fixing part, the intervening member, and the mating member are laminated and they should be fastened together with a bolt penetrating this through hole to thereby reach an inside of the mating member. In the collision detection apparatus according to this aspect, frictional force is produced as the result of an uneven member being formed in the facing sides. Therefore, even when the deforming body and the mating member are fixed together with a bolt as publicly known, displacement between the fixing part of the deforming body and the mating member is suppressed.

In the collision detection apparatus according to this aspect, there is no limitation on the specific shape of the deforming body as long as it includes the following: a substantially plate-shaped main part extended in the direction of the length of the vehicle; and a fixing part having a pair of fixing portions provided on the main part and fixed on a mating member, which is at least one of the side supporting member and the bumper reinforcement. Some examples will be taken. The deforming body may be so constructed that its main part is brought into tight contact with the side supporting member. (With this construction, the deforming body is in the shape of flat plate and the pair of fixing portions and the main part form a plane.) Or, the deforming body may be so constructed that its main part is held at a distance from the side supporting member. (With this construction, the pair of fixing portions and the main part form a substantial U shape or a substantial L shape in the direction of the length of the vehicle.)

In the collision detection apparatus according to this aspect, any member used in conventional collision detection apparatus can be used for the bumper reinforcement, side supporting member, and strain detecting device.

The strain detecting device only has to be capable of detecting strain in the main part of a deforming body when fixed on the main part. A publicly known strain gage or the like can be used for this purpose.

The side supporting member is a side member or a crash box. When a vehicle has a side member or a crash box, it can be used for this purpose. The crash box is used to absorb energy produced when a collision occurs between a vehicle and an object.

The collision detection apparatus according to this aspect is preferably so formed that the following is implemented: the side supporting member has a portion relatively high in strength in the direction of the length of the vehicle and a portion relatively low; and the strain detecting device detects strain in the portion of the side supporting member lower in strength in the direction of the length of the vehicle. The portion lower in strength in the direction of the length of the vehicle corresponds to the above-mentioned portion that is deformed at the time of a collision.

In general, side members and crash boxes are high in rigidity. When a pedestrian or the like collides with the relevant vehicle, they do no produce strain so much and it is difficult to detect the strain. To cope with this, the side supporting member is provided with a portion relatively high in strength in the direction of the length of the vehicle and a portion relatively low. Thus, when the vehicle collides with an object, stress is concentrated on the portion of the side supporting member relatively low in strength in the direction of the length of the vehicle. As a result, the stress exerted on the portion of the side supporting member relatively low in strength in the direction of the length of the vehicle becomes larger. Then, it becomes larger than stress exerted on the portion of the side supporting member relatively high in strength in the direction of the length of the vehicle. The amount of strain is increased with increase in compressive stress.

That it, the following can be implemented even when impact load applied to a vehicle when it collides with an object is small: strain produced in the portion of the side supporting member relatively low in the direction of the length of the vehicle can be so increased that it can be sufficiently detected by the strain detecting device. Therefore, use of this strain produced in the portion of the side supporting member relatively low in the direction of the length of the vehicle makes it possible to implement the following: even when collision load applied to the vehicle when it collides with an object is small, it can be sensed without fail that the vehicle has collided with an object.

As an additional aspect of the second aspect, a protection system may be provided to include: the collision detection apparatus of the second aspect; a protecting device for protecting a pedestrian when the vehicle incorporating the collision detection apparatus and the pedestrian collide with each other; a collision determining device that is inputted with an output signal from the collision detection apparatus and determines with what the vehicle has collided based on the output signal; and an actuating device for, when the collision determining device determines that the vehicle has collided with a pedestrian, actuating the protecting device.

The protection system according to this aspect uses the collision detection apparatus of the second aspect. In the protection system according to this aspect, (the strain detecting device of) the collision detection apparatus detects strain in the side supporting member when a pedestrian collides with the vehicle and puts out an output signal. As mentioned above, the polarity of this output signal is constant and false detection due to polarity inversion does not occur.

An output signal from the strain detecting device is inputted to the collision determining device, which in turn determines whether or not a pedestrian has collided with the vehicle. For the collision determining device to determine what has collided with the vehicle, a publicly known determination method can be used.

When the collision determining device determines that a pedestrian has collided with the vehicle, the actuating device transmits an actuation signal for actuating the protecting device to the protecting device according to this result of determination. In this aspect, the collision determining device and the actuating device may be constructed as one control unit (ECU (electronic control unit), etc.).

When the protecting device receives the actuation signal, it is actuated and protects the pedestrian. The protecting device is a publicly known protecting device, such as an air bag.

It will be obvious to those skilled in the art that various changes may be made in the above-described embodiments of the present invention. However, the scope of the present invention should be determined by the following claims.

What is claimed is:
1. A collision detection apparatus for a vehicle, the apparatus comprising:
    a bumper reinforcement disposed to be extended in a width direction of the vehicle;

a side supporting member including one of a side member and a crash box, the side supporting member being coupled with the bumper reinforcement and being disposed to be extended in a length direction of the vehicle;

a deforming body having (i) a substantially plate-shaped main part extended in the length direction and (ii) a fixing part including a pair of a first fixing portion and a second fixing portion, the fixing part being fixed to a mating member, the mating member including at least one of the side supporting member and the bumper reinforcement; and a strain detecting device fixed to the main part of the deforming body to detect strain produced in the side supporting member in the length direction of the vehicle, wherein an uneven member is formed in at least one of (i) a facing side of the fixing part and (ii) a facing side of the mating member opposing to each other, not to produce a slippage at an interface between the fixing part and the mating member, the slippage arising in the length direction of the vehicle.

2. The collision detection apparatus according to claim 1, wherein
the uneven member is formed in the facing side of the fixing part.

3. The collision detection apparatus according to claim 1, wherein
the uneven member includes a plurality of grooves, which are formed in the facing side of the fixing part to be extended in a direction intersecting with the length direction of the vehicle.

4. The collision detection apparatus according to claim 1, wherein:
one of the fixing part and the mating member is formed of a material harder than a material of an other of the fixing part and the mating member; and
the uneven member includes a projection in a facing side of the one of the fixing part and the mating member formed of the material harder to thereby be protruded toward the other with a tip of the projection biting into the other.

5. The collision detection apparatus according to claim 4, wherein
the fixing part is formed of a material harder than a material of the mating member; and
the projection is formed in the fixing part.

6. The collision detection apparatus according to claim 1, wherein
the fixing part is fastened to the mating member by a bolt, which penetrates a through hole provided in the fixing part, the bolt reaching an inside of the mating member.

7. The collision detection apparatus according to claim 1, wherein
a plurality of uneven members are provided in (i) at least one of a facing side of the first fixing portion and a facing side of the mating member facing the first fixing portion and (ii) at least one of a facing side of the second fixing portion and a facing side of the mating member facing the second fixing portion, so that at least one of the uneven members is disposed between a front end of the vehicle and the strain detecting device and at least one of the uneven members is disposed between the strain detecting device and a rear end of the vehicle.

8. The collision detection apparatus according to claim 1, wherein
the first fixing part and the first mating member are fastened together by a bolt, which penetrates a through hole provided in the fixing part and reaches an inside of the mating member;
a plurality of uneven members are provided, at least one of the uneven members is disposed closer to a front end of the vehicle with respect to the bolt and at least one of the uneven members is disposed closer to a rear end of the vehicle with respect to the bolt.

9. A protection system comprising:
the collision detection apparatus according to claim 1;
a protecting device configured to protect a pedestrian;
a collision determining device configured to determine an object that collides with the vehicle based on an output signal from the collision detection apparatus; and
an actuating device configured to actuate the protecting device when it is determined that the object that collides with the vehicle is a pedestrian.

10. A collision detection apparatus for a vehicle, the apparatus comprising:
a bumper reinforcement disposed to be extended in a width direction of the vehicle;
a side supporting member including one of a side member and a crash box, the side supporting member being coupled with the bumper reinforcement and being disposed to be extended in a length direction of the vehicle;
a deforming body having (i) a substantially plate-shaped main part extended in the length direction and (ii) a fixing part including a pair of a first fixing portion and a second fixing portion, the fixing part being fixed to a mating member, which includes at least one of the side supporting member and the bumper reinforcement; and
a strain detecting device fixed to the main part of the deforming body to detect strain produced in the side supporting member,
wherein an uneven member is formed in at least one of (i) a facing side of the fixing part and (ii) a facing side of the mating member opposing to each other, and
wherein the uneven member includes a plurality of grooves, which are formed in the facing side of the fixing part to be extended in a direction intersecting with the length direction of the vehicle.

11. A protection system comprising:
the collision detection apparatus according to claim 10;
a protecting device configured to protect a pedestrian;
a collision determining device configured to determine an object that collides with the vehicle based on an output signal from the collision detection apparatus; and
an actuating device configured to actuate the protecting device when it is determined that the object that collides with the vehicle is a pedestrian.

12. A collision detection apparatus for a vehicle, the apparatus comprising:
a bumper reinforcement disposed to be extended in a width direction of the vehicle;
a side supporting member including one of a side member and a crash box, the side supporting member being coupled with the bumper reinforcement and being disposed to be extended in a length direction of the vehicle;

a deforming body having (i) a substantially plate-shaped main part extended in the length direction and (ii) a fixing part including a pair of a first fixing portion and a second fixing portion, the fixing part being fixed to a mating member, which includes at least one of the side supporting member and the bumper reinforcement; and a strain detecting device fixed to the main part of the deforming body to detect strain produced in the side supporting member, wherein an uneven member is formed in at least one of (i) a facing side of the fixing part and (ii) a facing side of the mating member opposing to each other, and wherein the uneven member includes a groove, which is formed in the facing side of the fixing part to be extended in a direction intersecting with the length direction of the vehicle.

13. A protection system comprising:

the collision detection apparatus according to claim 12;

a protecting device configured to protect a pedestrian;

a collision determining device configured to determine an object that collides with the vehicle based on an output signal from the collision detection apparatus; and an actuating device configured to actuate the protecting device when it is determined that the object that collides with the vehicle is a pedestrian.

\* \* \* \* \*